United States Patent Office 3,645,909
Patented Feb. 29, 1972

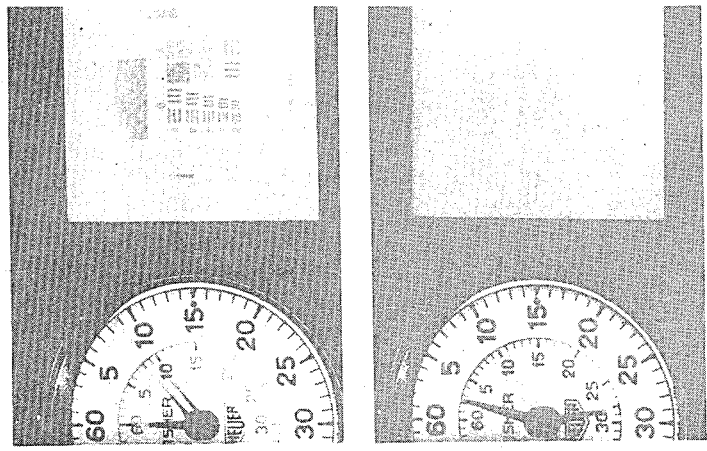
low viscosity
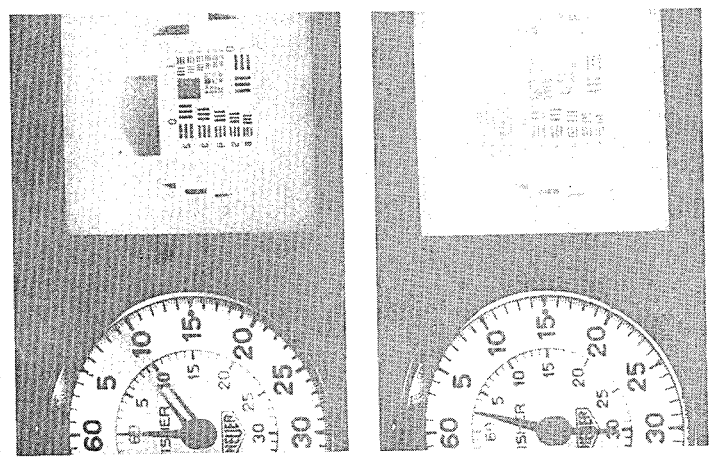
high viscosity

3,645,909
VARIABLE DENSITY LIGHT FILTERING SYSTEM
Richard J. Hovey, Sturbridge, Mass., assignor to American Optical Corporation, Southbridge, Mass.
Filed June 30, 1969, Ser. No. 837,764
The portion of the term of the patent subsequent to Oct. 29, 1985, has been disclaimed
Int. Cl. F21v 9/00, 9/06; G02b 5/24
U.S. Cl. 252—300                                        9 Claims

ABSTRACT OF THE DISCLOSURE

A system having the property of automatically varying in optical density in response to a variation in incident light including a solution of a photochromic leuco dye and a completely reversible reducing agent both dissolved in a high viscosity polyhydric alcohol.

The invention herein described was made in the course of or under a contract with the Department of the Navy.

BACKGROUND OF THE INVENTION

Light filters of variable optical density are known in the art, and such filters are particularly useful where frequent or sudden changes in light intensities are encountered. One form of a variable density light filter is disclosed in U.S. Pat. 3,408,134, patented Oct. 29, 1968, wherein protective spectacles, lenses or goggles are made of variable density filters to permit variation of the optical density of the lenses as the wearer moves in and out of different light conditions. The system of that patent utilizes a leuco thiazine dye and a reversible reducing agent. In another system, a leuco safranine dye and a reversible reducing agent is provided for a variable light filter. Other photochromic leuco base dyes may be utilized for the variable light filter, providing absorption of different wavelengths and thereby providing different colors for the light filter.

Heretofore, the photochromic leuco base and reversible reducing agent has been dissolved in an aqueous solution with a sufficient amount of mineral acid, such as hydrochloric acid, to provide a low pH. Under normal conditions, the aqueous solutions of the prior art variable optical density light filters are used in very thin layers, and it has been found that the aqueous formulation of the photochromic systems are diffuse and of low resolution. This results in a gradual diffusion of the photochemically generated colored dye moleculues from the activated regions of the liquid photochromic layer to the unactivated regions producing a rapid, continuous degradation of the image quality.

SUMMARY OF THE INVENTION

According to the present invention a variable optical density light filter formed of a photochromic leuco base dye with a reversible reducing agent is incorporated in a high viscosity medium which reduces the rate of diffusion of the colored species of molecules into the unactivated areas of photochromic leuco molecules of the filter medium. These improvements in photochromic image quality have proved particularly advantageous in such applications, among others, as photographic dodging, optical signal processing, holography and dynamic displays.

Included among the objects and advantages of the present invention is an improved photochromic system for incorporation into a variable optical density light filter.

Another object of the invention is to provide a variable optical density light filter material formed of a photochromic leuco base dye and a reversible reducing agent dissolved in a high viscosity polar liquid.

A further object of the invention is to provide a system for incorporation in a variable optical density light filter with high resolution and a persistent image.

BRIEF DESCRIPTION OF THE DRAWING

FIG. 1, the sole figure of the drawing, consists of photographs of the comparative photochromic images in a high and low viscosity medium at elapsed times of about 9 seconds and about 2 minutes 30 seconds.

DESCRIPTION OF THE PREFERRED EMBODIMENTS

In general, a leuco base dye may be formed in a solution of the dye with a completely reversible reducing agent, such as stannous chloride, titanous chloride and sodium dithionite. The concentration of the dye and the reversible reducing agent are usable in a fairly wide range, and in general, the concentration of the leuco base dye is greater than about $2.0 \times 10^{-5}$ M along with sufficient amount of the reversible reducing agent to be at least as great as the concentration of dye, and preferably in a range of from 1 to 15 times greater than the concentration of the dye.

The chemical reaction involved to produce a photochromic solution is believed to comprise a reversible photooxidation process. It is, therefore, quite important that all atmospheric oxygen be excluded from the chemical system to permit the chemical reaction to occur in response to variations in light impinging on the solution. This can be accomplished by placing the system between two glass plates to form a cell. It is believed that the reaction which actually takes place in a stannous chloride embodiment of the invention is that the stannous ions of the stannous chloride are oxidized in the solution to stannic ions under the influence of ultraviolet or other short wavelength light rays, and the stannic ion oxidizes the leuco dye to the colored state. In the absence of activating light the dyes are reduced back to the leuco state.

It is to be understood that reference to stannous chloride as a reversible reducing agent is merely illustrative of a specific photochromic system. The invention, however, is not intended to be limited to this specific example. A controlling requirement for the reducing agent is that it be completely reversible and that it be soluble in the polyhydric alcohol chosen to dissolve the dye. Stannous chloride, titanous chloride and sodium dithionite have been found to be satisfactory. The scope of the invention is intended to include any reducing agent that is completely reversible with the dye and that is soluble in the same polyhydric alcohol solvents as the dye.

In using a variable optical density light filter very thin layers of the photochromic compositions are used. The thickness varies somewhat for different uses, but this should not normally greatly exceed nor be substantially less than about 2 mils. In prior art low viscosity solutions, the colored dye molecules, which have been activated by the ultraviolet or other light, diffuse quite rapidly from the activated region of the liquid photochromic layer into the unactivated regions. In accordance with the present invention by placing the leuco dye-completely reversible reducing agent system in a high viscosity medium, the diffusion is greatly reduced and a persistent image with high resolution is produced. In addition to improving image resolution, the utilization of polyhydric alcohols as solvents for the dye and reversible reducing agent enables the elimination of the mineral acid which has been found necessary in aqueous systems. Thus a system having the desired property of high image resolution results from the combination of a photochromic leuco dye and reversible reducing agent dissolved in a polyhydric alcohol. It is to be understood, however, that a mineral acid may be included in the photochromic system in order to speed up the rate of recovery. It is to be further understood that such use of a mineral acid in a photochromic system to speed up the rate of recovery is known and within the skill of the art.

As a specific example, a leuco base of a thiazine dye called Azure C in an amount of $9.26 \times 10^{-4}$ M is mixed together with stannous chloride in a concentration of $5.64 \times 10^{-3}$ M and is added to a solution which is 70% by weight of glycerin and 30% of 1 M hydrochloric acid. The mixture is thoroughly mixed and placed between two glass plates forming a photochromic layer of approximately 2 mils thickness. An image is obtained in each case by irradiating the photochromic layer for one minute with a collimated ultraviolet light through a USAF resolving power test target. For comparison, another test solution is formed of the same amounts of dye and stannous chloride placed in 100% 1 M hydrochloric acid. The results of a test of both samples is dramatically shown in FIG. 1. The higher viscosity medium provides a substantially improved resolution initially and persists considerably longer with better resolution than the dye in aqueous medium. As shown in the drawing, the resolution at the end of about 2½ minutes shows the considerably improved resolution of the system in the high viscosity medium as compared to the system in the very low viscosity water medium. Also, as the rate of diffusion of the colored dye molecules from the exposed regions of the photochromic layer is considerably less in a higher viscosity medium compared to the lower viscosity medium, the exposure or time necessary to achieve a given contrast ratio is, also substantially reduced.

As used throughout this specification and claims, the term photochromic dyes include thiazine dyes, sometimes called phenothiazine dyes such as Azure C, Toluidine Blue O, New Methylene Blue, Methylene Blue, Thionine, Azure B, Azure A, similar thiazine dyes, safranine dyes which include Dimethylsafranine, Rhoduline Violet, Safranine B, Janus Blue, Janus Green, Janus Green B, Janus Black, Ethyl Blue, Amethyst Violet, Rhoduline Red, Neutral Red, Pinakryptol Green, etc.

The high viscosity solutions for containing the photochromic dyes according to the invention include polyhydric alcohols such as ethylene glycol, glycerol, erythritol, arabitol, mannitol, sorbitol, various dihydric, trihydric, tetrahydric and polyhydric alcohols, generally regarded as hydroxol derivatives of parafinic hydrocarbons or as alkyl derivatives of water. The important function of the polyhydric alcohol is to provide a viscous solution in which the photochromic leuco base dye is soluble as well as the reversible reducing agent. Thus any polyhydric alcohol which functions as such a solvent is usable in accordance with the invention. The solvent is normally obtained by the addition of an aqueous solution of a mineral acid and the polyhydric alcohol, it being understood that the polyhydric alcohols are soluble in water. However as was explained above, the solvent can be only polyhydric alcohol. The alcohol is present in amounts of from 50%-90% (by weight). This is adjusted by adjusting the molarity of the mineral acid, usually from about 0.5-2.0 M, to provide the acidity necessary for the desired recovery rate. In systems where fast recovery rates are not critical, no acid is employed in the system, in which case the solvent comprises 100% polyhydric alcohol. The composition of the solution is determined by the temperature in which the filter means is to be used; with a higher temperature of use dictating higher molecular weight polyhydric alcohols to provide a higher viscosity at the higher temperatures. In the case of the 70% by weight of glycerol (glycerin) and 30% 1 M hydrochloric acid, there is approximately a 20 fold increase in viscosity over the 100% aqueous hydrochloric acid solution.

What is claimed is:

1. An improved reversible photochromic system for incorporation in a variable optical density light filter comprising a solution of a photochromic leuco base dye and a completely reversible reducing agent in a polyhydric alcohol, wherein the photochromic leuco base dye is selected from the group consisting of Azure C, Toluidine Blue O, New Methylene Blue, Methylene Blue, Thionine, Azure B, Azure A, Dimethylsafranine, Rhoduline Violet, Safranine B, Janus Blue, Janus Green, Janus Green B, Janus Black, Ethyl Blue, Amethyst Violet, Rhoduline Red, Neutral Red, and Pinakryptol Green, the reducing agent is selected from the group consisting the stannous chloride, titanous chloride, and sodium dithionite, and the polyhydric alcohol is selected from the group consisting of ethylene glycol, glycerol, erythritol, arabitol, mannitol, and sorbitol.

2. An improved photochromic system according to claim 1 wherein said solution is wormed of 50–90 weight percent of polyhydric alcohol.

3. An improved photochromic system according to claim 1 wherein the dye is a thiazine dye.

4. An improved photochromic system according to claim 1 wherein the dye is a safranine dye.

5. An improved photochromic system according to claim 1 wherein said polyhydric alcohol is glycerol.

6. An improved photochromic system according to claim 5 also including aqueous hydrochloric acid in said solution.

7. An improved photochromic system according to claim 1 wherein said polyhydric alcohol is a dihydric alcohol.

8. An improved photochromic system according to claim 1 wherein said polyhydric alcohol is a trihydric alcohol.

9. An improved photochromic system according to claim 1 wherein said reducing agent is stannous chloride.

References Cited
UNITED STATES PATENTS

| | | | |
|---|---|---|---|
| 2,324,060 | 7/1943 | Boughton | 96—4 G |
| 3,390,933 | 7/1968 | Hovey et al. | 252—300 |
| 3,408,134 | 10/1968 | Hovey | 252—300 |

GEORGE F. LESMES, Primary Examiner

J. P. BRAMMER, Assistant Examiner

U.S. Cl. X.R.

96—90 PC